UNITED STATES PATENT OFFICE 2,170,434

ARTICLE OF MANUFACTURE AND METHOD OF MAKING THE SAME

William R. Seigle, Mamaroneck, N. Y., assignor to Johns-Manville Corporation, New York, N. Y., a corporation of New York No Drawing. Application October 12, 1935, Serial No. 44,656

4 Claims. (Cl. 106—)

This invention relates to an article of manufacture and the method of making the same.

It is an object of the present invention to provide a strong panel of satisfactory electrical resistivity on exposure to the highest temperatures experienced during use as an electric switchboard panel or the like. Another object is to provide a fibre-reenforced cementitious composition of reduced moisture absorptiveness. A further object is to provide a method of treatment of a fibre-reenforced cementitious article, to reduce the moisture absorptivness of the fibres and/or of the cement therein. Other objects and advantages will appear from the detailed description that follows.

More particularly, the invention comprises a shaped, compressed and hardened sheet including a hydraulic cement, originally moisture absorptive fibres distributed as reenforcement therethroughout, and a small proportion of a non-carbonizing water-repellent agent intimately associated with the said fibres, with substanial reduction of the moisture absorptiveness and preservation largely of the strength of the sheet.

The invention comprises, also, the method of manufacture which includes forming and hardening a sheet of the composition described and then subjecting it to an elevated temperature, to improve the effectiveness of the aforesaid agent. Suitably, the sheet is subjected also to carbonation, to improve various properties of the sheet.

The improved sheets of the present invention are adapted for use as structural units and, especially, as electric switchboard panels, including mounts for electrical control equipment or terminals. The invention will be illustrated, therefore, by its specific application in connection with electrical switchboards.

A composition that has been widely used heretofore for electrical switchboards has been made by forming a compressed and hardened sheet of asbestos and Portland cement and then impregnating the sheet with a large proportion of an asphaltic composition. When such a switchboard panel is exposed on its surface to a high temperature, such, for example, as obtains when a deposit of iron-containing dust in a steel mill forms a short circuit between electrical terminals, there is serious burning or carbonizing of the asphaltic impregnating material, with permanently injurious results to the panel.

In general, there is first formed an intimate mixture of a hydraulic cement, reenforcing fibres that are per se adapted to absorb a substantial proportion of moisture, a small proportion of a water-repellent agent, and water. The mixture is then shaped and compressed in a filtering mold or other suitable sheet-forming apparatus, to consolidate and densify the composition and remove therefrom excess water. The shaped article is then allowed to stand or otherwise treated to cause hardening of the cement therein. Because of the very small proportion of the said agent that is used, the agent is considered to be discontinuously dispersed so that products of decomposition of it would not form a continuous coke-like mass throughout the article.

The water-repellent agent should be non-carbonizing at elevated temperatures to which the agent may be subjected during use and substantially non-volatile at ordinary temperatures. I have used to advantage solid water-repellent agents that are fusible at temperatures well below the temperature of dehydration and attendant weakening of the cured sheet containing one of the said agents.

The hardened sheet is warmed to cause drying and/or, if the water-repellent agent used is fusible, to cause change of state of the said agent and improve the distribution and increase the effectiveness thereof in the finished product.

The cement preferred is calcium aluminate cement, sometimes called cement fondu, the material known as Lumnite cement having been used to advantage. Portland cement may be used as a substitute for the aluminate cement, although the latter is more desirable for certain purposes of the present invention.

The fibres used are suitably milled chrysotile or crocidolite, the chrysotile fibres being preferred. Thus, I have used chrysotile asbestos fibres from Canada, of average fibre length that may be considered as short, showing, in the standard asbestos screening test, approximately 44 per cent by weight passing through a 4-mesh and being retained on a 10-mesh screen and 56 per cent passing through the 10-mesh screen. Within limits, increased strength of the finished product and increased moisture absorptiveness are obtained as the average length of asbestos fibres used increases.

As the water-repellent agent there may be used a small proportion of a non-carbonizing, water-insoluble, non-hygroscopic material adapted to impart to the fibres negative capillarity for water. Thus, there may be used paraffin wax, although superior results have been obtained with the use of water-repellent soaps, such as aluminum stearate, zinc stearate, or the like. Aluminum stearate is preferred. It is very effective as a water-repellent agent and is fusible and readily undergoes change of state, upon warming of the hardened asbestos Portland cement sheet containing the aluminum stearate.

While all organic compounds may be subject to carbonizing if subjected to sufficiently severe conditions, the term "non-carbonizing" is used herein to indicate the degree of resistance to carbonizing that is possessed by the examples of the so-called "non-carbonizing" agents that may be used. More specifically, the term "non-carbonizing" as applied to the agent means that, when used in the limited proportion described, the agent shows little or no tendency to carbonize, in the finished sheet product including the agent and subjected to the conditions of use for which the sheet product is intended, particularly, for use as an electrical switchboard panel.

Expressed in more restricted and more accurate manner, the term "non-carbonizing", as applied to the water-repellent agent, means adapted to form no continuous conducting coke-like material throughout the panel when subjected to electrical short circuits or very severe heating.

It will be understood that the stearate used may be a commercial product containing soaps not only of stearic acid but also of palmitic and/or oleic acids and lesser amounts of other ingredients.

In order to color the sheet product, there may be introduced a non-carbonizing pigment that is a non-conductor of electricity. Thus, there may be used manganese dioxide, titanium oxide, or the like.

The proportions of materials may be varied within limits, the exact proportions selected depending upon the properties desired in the finished product. Thus, I have used the cement and reenforcing fibres in approximately equal proportions by weight, say, 80 to 110 parts of the fibres to 100 parts of the cement. The pigment is used in amount and of kind to give the color desired without disturbing seriously the dielectric properties. Thus, I have used manganese dioxide in the proportion of 5 parts by weight to 100 parts of the finished sheet product.

The proportion of water-repellent agent should be controlled carefully, to give the desired decrease in moisture absorptiveness of the article as a whole, while preserving largely the strength of the article. Thus, I have used aluminum stearate in proportion of the order of 2 parts by weight to 100 parts of the finished article or 4 parts to 100 of the fibres. Since the invention is not limited to any theory of explanation of the mechanism by which moisture is taken up by the article, the term "absorptiveness" is used herein to include "adsorptiveness".

With such a proportion of ingredients, I have obtained a product that shows a loss of strength of less than 25 per cent, as compared with the same cement, asbestos, and pigment composition without the use of the water-repellent agent. A typical specimen of the product with the said agent included had a modulus of rupture of four thousand pounds per square inch, when tested in one-inch thickness, a high dielectric strength or resistance, about 25 kilovolts or more per inch, and low moisture absorptiveness, only about 2 per cent by weight of water being absorbed by the predried product when immersed in liquid water for 48 hours.

For best results, the proportion of water-repellent agent should be between 1 and 3 per cent of the weight of the finished product.

In making the improved product with aluminum stearate, for example, the fibres may be first mixed with stearate in solid, finely divided form, as by tumbling or agitation in a dry condition, to give coated fibres. The mixed fibres and water-repellent agent are then charged to a wet mixer along with the hydraulic cement, the selected non-carbonizing pigment, and water in proportion to give a fluent aqueous mixture. After the aqueous mixture is made, it is shaped, as into sheet form, and consolidated under high pressure in a filtering mold. Thus, there may be used a pressure of 2000 pounds or more to the square inch, to give a strongly compressed and densified product from which the excess of water has been expressed.

The shaped article is then cured, as by being allowed to stand in moist air until the cement used is hardened. This curing may extend over about seven days when the cement used is Lumnite or thirty days when the binder used is Portland cement.

The hardened sheet may be subjected to carbonation, to decrease the moisture-absorptiveness. Thus, I have subjected the hardened sheet to the action of carbon dioxide under super-atmospheric pressure, as, for example, at 50 pounds gage per square inch, to facilitate penetration of the gas into the sheet and reaction with lime in the cement component, presumably by conversion of such ingredient to a substantially non-hygroscopic and harmless carbonate. The carbonation, also, increases the density and strength of the finished sheet, the increases for a typical sheet containing the aluminate cement being 6 and 15 per cent, respectively. Furthermore, the carbonation produces better electrical properties in the finished sheet, particularly when exposed to a very moist atmosphere.

The hardened sheet, for best results, is subjected to an elevated temperature to cause drying of the sheet and change of state of the aluminum stearate or other fusible water-repellent agent used. Thus, the sheet may be heated at a temperature above the melting point of the said agent but below the temperature of dehydration and attendant weakening of the cement bond.

Using the aluminum stearate as the water-repellent agent, I have heated the hardened sheet to a moderately elevated temperature, to a maximum temperature not substantially above 250 to 300° F., for several hours, to dry the sheet, improve the distribution of the said agent throughout the article and make more intimate the association between the stearate and the asbestos fibres, or otherwise decrease the moisture adsorptiveness of the product.

It will be understood that the details given are for the purpose of illustration, not restriction, and particularly that certain features described my be omitted if their function in the finished article is not desired. It is intended, therefore, that variations within the spirit of the invention should be included in the scope of the appended claims.

What I claim is:

1. A compressed and hardened electric insulator sheet comprising cement, asbestos fibres distributed as reenforcement therethroughout, and a water-repellent agent selected from the group consisting of paraffin wax, zinc stearate, and aluminate stearate in proportion of one to three parts by weight to one hundred parts of the said sheet, the said agent being intimately associated with the said fibres, whereby the moisture absorptiveness of the sheet is substantially reduced.

2. A compressed and hardened electric switch board panel comprising calcium aluminate cement, asbestos fibres distributed as reenforcement therethroughout, and aluminum stearate, in proportion of the order of two parts by weight to one hundred parts of the said panel, the said stearate being in the condition of having been distributed throughout the said panel by fusion therein.

3. A shaped and hardened electric switchboard panel consisting essentially of a hydraulic cement, asbestos fibres distributed as reenforcement therethroughout, and a discontinuous water-repellent agent intimately associated with the said fibres in proportion of the order of 2 parts by weight to 100 parts of the said panel, the cement being carbonated to decrease the moisture absorptiveness and strengthen the article.

4. A shaped and hardened electric switchboard panel comprising calcium aluminate cement, reenforcing fibres distributed therethroughout and being adapted per se to absorb a substantial proportion of moisture, a substantially non-carbonizing and non-conducting pigmentary substance, and a discontinuously dispersed water-repellent agent intimately associated with the said fibres and reducing the moisture absorptiveness of the article, the proportion of the water-repellent agent being of the order of 2 parts by weight to 100 parts of the panel.

WILLIAM R. SEIGLE.